Figure 1:
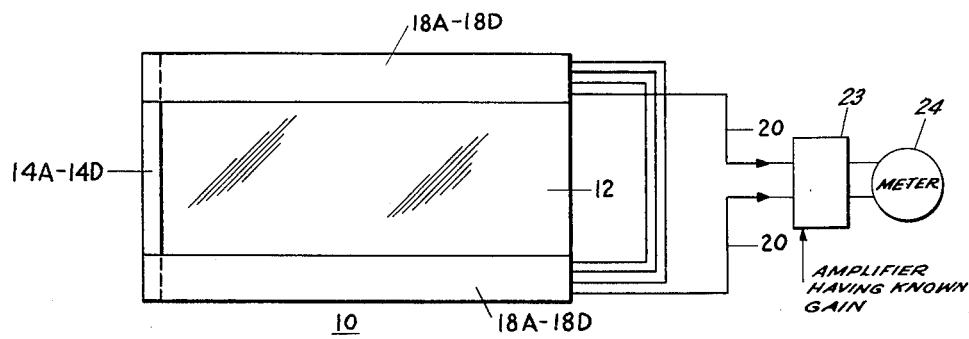

July 24, 1962

F. A. COMERCI ET AL 3,046,358

NON-MAGNETIC PICKUP LOOP FOR MAKING ABSOLUTE MEASUREMENT
OF SIGNAL STRENGTH ON MAGNETIC RECORDINGS

Filed Dec. 23, 1955

INVENTORS
FRANK A. COMERCI
ROBERT SCHWARTZ
BY SHELDON I. WILPON

George Sipkin
Lee I. Huntzberger
ATTORNEYS

United States Patent Office  3,046,358
Patented July 24, 1962

3,046,358
NON-MAGNETIC PICKUP LOOP FOR MAKING ABSOLUTE MEASUREMENT OF SIGNAL STRENGTH ON MAGNETIC RECORDINGS
Frank A. Comerci, Nutley, N.J., and Robert Schwartz and Sheldon I. Wilpon, New York, N.Y., assignors to the United States of America as represented by the Secretary of the Navy
Filed Dec. 23, 1955, Ser. No. 555,213
5 Claims. (Cl. 179—100.2)
(Granted under Title 35, U.S. Code (1952), sec. 266)

The invention described herein may be manufactured and used by or for the Government of the United States of America for governmental purposes without the payment of any royalties thereon or therefor.

This invention relates to a device for making an absolute measurement of the signal strength on magnetic recordings and, more particularly, to a non-magnetic pickup loop which generates a voltage proportional to the surface induction on a magnetic recording. A non-magnetic pickup loop is one which contains no magnetic material in its flux circuit, in contrast to a magnetic pickup loop which has in the flux path of the loop a body of magnetic material. For example, an iron core passing through the pickup loop would be a magnetic pickup loop. A non-magnetic pickup loop has as one advantage that no eddy current losses are involved when determining the relative surface induction.

There are at present many satisfactory methods, such as the "short gap" method, for measuring the relative surface induction on a magnetic recording over a frequency range of interest. It is extremely desirable that the absolute surface induction, rather than the relative surface induction, be measured at least one discrete frequency within this frequency range, so that the relative surface induction may be "pegged" at this discrete frequency.

A non-magnetic loop for measuring the absolute surface induction on a magnetic recording was first suggested by E. B. Daniel and P. E. Axon in their article, "The Reproduction of Signals Recorded on Magnetic Tape," PROC. IEE, Part III; 157, May 1953. The non-magnetic pickup loop disclosed in this article consists of a strip of copper foil having a thickness dimension in the order of 1 mil and a width dimension in the order of 10 to 20 mils. This copper foil is sandwiched between two pieces of ebony and glued thereto. A measurement is made by placing the loop in close proximity to a moving magnetic tape, with the length of the copper foil oriented parallel to the width of the magnetic tape and the thickness of the loop oriented parallel to the length of the magnetic tape. A voltage is thereby induced in the copper foil, and the output therefrom, which is taken from the respective ends thereof, is measured by means of an amplifier of known gain.

Daniel and Axon derive the following equation for the output from their non-magnetic pickup loop:

$$B_y = \frac{E}{vw\left[\frac{1-e^{\frac{-2\pi d}{\lambda}}}{\frac{2\pi d}{\lambda}}\right]\left[\frac{\sin\frac{\pi b}{\lambda}}{\frac{\pi b}{\lambda}}\right]}$$

wherein E is the peak or R.M.S. voltage output respectively from the loop, $v$ is the tape speed in inches per second, $w$ is the active tape width in inches, $B_y$ is the peak or R.M.S. surface induction, respectively, normal to and at the surface of the tape ($v$-sec./sq. in., for $B_y$ in gausses, multiply by $1.55 \times 10^7$), $d$ is the width of the non-magnetic pickup loop in inches, $b$ is the thickness of the non-magnetic pickup loop in inches, and $\lambda$ is the recorded wavelength in inches, and $e$ is the base of Naperian logarithms.

The non-magnetic loop of Daniel and Axon was found to be rather unsatisfactory for three reasons. First, the above-cited formula derived by Daniel and Axon is based on the assumption that there is perfect contact between the tape and loop, and, therefore, no "spacing loss." Of course, this is not true in practice. The "spacing loss" as a matter of fact turns out to have a large magnitude which overshadows the effects of $b$. Secondly, since $B_y$, the surface induction, is a function of both $b$ and $d$, the thickness and width, respectively, of the non-magnetic pickup loop, it is necessary that these dimensions be uniform over the entire length of the non-magnetic pickup loop; otherwise, a high precision measurement of the absolute surface induction cannot be achieved. However, it is very difficult, if not impossible, to construct a non-magnetic pickup loop with the high uniformity required, by utilizing the method of construction suggested by Daniel and Axon, i.e., a copper foil sandwiched between two pieces of ebony. Thirdly, the output voltage obtainable from a single non-magnetic pickup loop is extremely low, being in the order of a fraction of a microvolt. Because of this, the signal-to-noise ratio obtainable from a single non-magnetic loop is quite low. This low signal-to-noise ratio obviously affects the accuracy of any measurement made of the absolute surface induction.

It is therefore an object of this invention to provide a simple method for constructing a non-magnetic loop which has the required uniform thickness and width dimensions over its entire length.

It is a further object of this invention to provide a non-magnetic loop capable of producing an output signal having a relatively high signal-to-noise ratio.

It is a still further object of this invention to provide a modification in the formula for the absolute surface induction derived by Daniel and Axon, which modification takes into account the "spacing loss."

Figure 2:
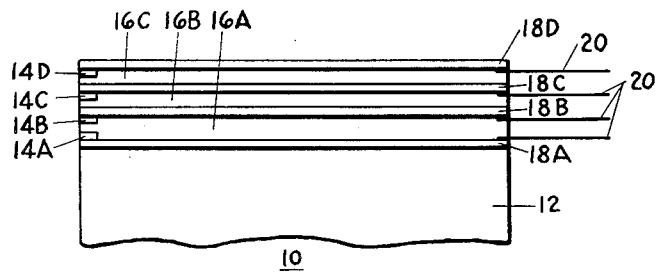
Figure 3:
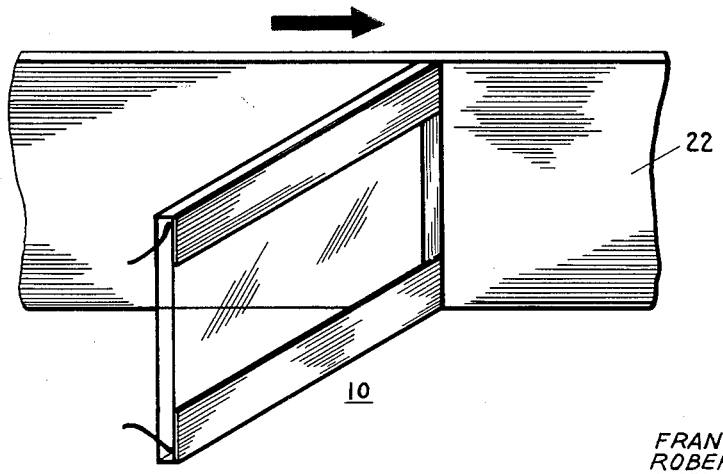

Other objects and many of the attendant advantages of this invention will be readily appreciated as the same becomes better understood by reference to the following detailed description when considered in connection with the accompanying drawings wherein:

FIG. 1 is a diagrammatic plan view of a non-magnetic pickup loop embodying the principles of this invention, FIG. 2 is a diagrammatic elevation or top edge view of the non-magnetic pickup loop shown in FIG. 1, and FIG. 3 is a diagrammatic view illustrating the orientation of the non-magnetic pickup loop relative to a magnetic tape or film for the making of a measurement of the absolute signal strength thereon.

In FIGS. 1 and 2, there is shown a non-magnetic pickup loop 10 constructed in accordance with the principles of this invention. Non-magnetic pickup loop 10 is shown in FIGS. 1 and 2 to a distorted magnified scale in order to more clearly show the elements thereof. Non-magnetic pickup loop 10 consists of a glass slide 12 on which is placed four aluminum principal elements 14A, 14B, 14C, and 14D, respectively, which are insulated from each other by dielectric coatings 16A, 16B, and 16C, respectively. Electrical connection is made to each of principal elements 14A through 14D, respectively, by means of conductive silver painted electrodes 18A, 18B, 18C, and 18D, respectively, and wires 20 which are connected as shown to each of painted electrodes 18A through 18D, respectively, to thereby place principal elements 14A through 14D in series with each other.

The method by which non-magnetic loop 10 is constructed is particularly significant, and consists of the following: First, silver electrodes 18A are painted along two opposite edges of glass slide 12, on the same face of the slide, as shown. Secondly, glass slide 12 is suitably masked and aluminum principal elements 14A is deposited in the position shown to the desired thickness by vacuum distillation, a process well known in the art. Thirdly, principal element 14A, and silver electrode 18A are insulated by spraying on dielectric coating 16A in lacquer form. Aluminum principal element 14B is then deposited in the same manner as principal element 14A, silver electrodes 18B are painted on, dielectric 16B is sprayed over electrodes 18B, and the entire process is repeated for aluminum principal elements 14C and 14D.

If desired, aluminum principal element 14A can be deposited directly on glass slide 12 and silver electrode 18A painted over principal element 14A, rather than under it, as shown in FIGS. 1 and 2.

FIG. 3 merely illustrates the orientation of non-magnetic pickup loop 10 with respect to magnetic tape or film 22, which, of course, moves past non-magnetic pickup loop 10 at a constant speed, as shown by the arrow.

As shown, the width dimension of magnetic tape or film 22 is oriented parallel to the length of principal elements 14A through 14D, and the length dimension of magnetic tape or film 22 is oriented parallel to the thickness of principal elements 14A through 14D.

As discussed above, Daniel and Axon derive their formula for the absolute surface induction of a non-magnetic pickup loop assuming no 'spacing loss.' However, when a spacing "S" is assumed, the formula for the absolute surface induction becomes:

$$B_y = \frac{E}{vw \left[ e^{-\frac{2\pi S}{\lambda}} \right] \left[ \frac{1 - e^{-\frac{2\pi d}{\lambda}}}{\frac{2\pi d}{\lambda}} \right] \left[ \frac{\sin \frac{\pi b}{\lambda}}{\frac{\pi b}{\lambda}} \right]};$$

wherein the symbols used have the same significance as in Daniel and Axon's formula. It should be noted that the output voltage E in this latter formula is the output voltage from only a single one of the principal elements of the non-magnetic pickup loop.

As heretofore mentioned, non-magnetic pickup loops, of the type described herein, generate an extremely low output voltage, i.e., in the order of a fraction of a microvolt. Therefore, the width and the thickness of each of the principal elements 14A through 14D, respectively, are dimensioned to minimize internal losses so as to obtain maximum voltage output over the frequency range of interest. In a non-magnetic pickup loop which was actually constructed, each of principal elements 14A through 14D, respectively, had a width of approximately $\frac{1}{64}$ of an inch and a thickness of approximately 1 mil.

By connecting a number of principal elements in series with each other, the total output may be further increased, with a corresponding increase in the signal-to-noise ratio obtained. This is why four principal elements 14A through 14D are utilized in the disclosed embodiment. The total output voltage obtained from principal elements 14A through 14D connected in series is equal to the algebraic sum of the individual outputs of each of the principal elements 14A through 14D. Since principal elements 14A through 14D are in spaced relationship with respect to each other, there will be a phase difference between the output voltage obtained from each of these principal element. Therefore the maximum number of principal elements which may be used effectively is limited by the fact that the total thickness of all the principal elements used plus the thickness of the dielectric coatings between them must be at least less than a half wavelength of the signal on the magnetic tape or film to obtain a voltage addition. It has been found that four principal elements give optimum results over the audio frequency range.

The manner in which non-magnetic pickup loop 10 is operated to determine the absolute surface induction $B_y$ is as follows:

Non-magnetic pickup loop 10 is first oriented relative to magnetic tape or film 22 as shown in FIG. 3. Magnetic tape or film 22 has a known active tape width $w$, and is prerecorded with a signal having a known wavelength $\lambda$. Furthermore, magnetic tape or film 22 is operated at a known tape speed $v$. The output voltage derived from non-magnetic pickup loop 10 is applied as an input to an amplifier 23 having a known gain, and the output of the amplifier is measured by means of a suitable meter 24. Since the amplifier has a known gain and there are four principal elements, 14A through 14D, connected in series, the output voltage, E, from any single one of the principal elements may be easily computed by dividing the meter measurement by four times the known gain of the amplifier. In a similar manner the output voltage E may be individually determined for each of three other and different known prerecorded wavelengths $\lambda$. The four respective sets of values for E and $\lambda$ may then be substituted in the latter formula for the absolute surface induction, set forth above, to thereby provide a set of four simultaneous equations. By solving these four simultaneous equations, the effective value of the $b$ and $d$ dimensions of a single principal element of loop 10, as well as the spacing loss S and the absolute surface induction $B_y$, may be easily computed.

Portions of this invention were originally disclosed in an article "Absolute Measurement of Signal Strength on Magnetic Recordings," which appeared in the January 1955 issue of "Journal of the SMPTE," volume 64.

Obviously many modifications and variations of the present invention are possible in the light of the above teachings. It is therefore to be understood that within the scope of the appended claims the invention may be practiced otherwise than as specifically described.

We claim:

1. A non-magnetic pickup loop for making absolute measurements of the signal strength on magnetic recordings on the face of an element when the loop is disposed in close proximity to said face with said recordings, which comprises a rigid plate of non-magnetic and non-conducting material having a straight edge and a flat face contiguous with said edge, a plurality of turns of a conductor of non-magnetic material forming a loop confined flat against said face with one side of said loop disposed closely to and extending along said straight edge, the portion of each of said turns that extends along said straight edge having a thickness in a direction normal to said face materially less than 1 mil and abutting flat against said face, but with said portions superposed on one another on said face in a direction away from, but normal to, said flat face, and film-like layers of a dielectric interposed between said superposed portions and insulating them from one another, the total thickness of said superposed portions and interposed dielectric layers along said straight edge being equal to a small fraction of half a wave length of the shortest wave length of signal expected to be carried on said recordings, whereby when said loop is disposed with its plane at a substantial angle to said face of said recordings and with its said straight edge parallel to and approximately contiguous to said face having said recordings, the signal induced in the loop by relative movement of the face of said element with said recordings and said loop will correspond closely to the recorded signal.

2. In a signal transfer device of the type having an element with an elongated face surface capable of receiving and magnetically holding a signal, and a pickup loop associated therewith, that improvement in the pickup loop which comprises a rigid plate of non-magnetic and non-conducting material having a straight edge and a flat face that is contiguous with said edge, a loop formed of a plurality of series-connected turns of a conductor of non-magnetic material confined flat against said plate face, with one side edge of the loop disposed closely along and contiguous with said straight edge, the portion of each of said turns that extends along said straight edge abutting flat against said plate face, but superposed on one another on said plate face in a direction away from that plate face, and thin films of dielectric material interposed between and separating and insulating from one another said superposed portions of said conductor that extend along said straight edge, the total thickness of said superposed portions of said conductor and the interposed films along said straight edge being a small fraction of half a wave length of the shortest wave length of a signal that is expected to be recorded on said face surface of said element, whereby when said loop is disposed with its straight edge parallel to and contiguous with said face surface of said element, and upon relative movement of said element and loop in a direction along said element face, a signal may be transferred between said loop and element with maximum strength and clarity.

3. A non-magnetic pickup loop which comprises a rigid plate of non-magnetic and electrically non-conducting material having a straight edge and a flat face contiguous with said edge, a plurality of U-shaped thin strips of electrically conducting non-magnetic material confined flat against said face in superposed, aligned relation with one another and with film-like layers of dielectric material disposed between and separating the superposed strips, and with the base portion of each strip disposed close to, and extending along, said straight edge of said plate, the total thickness of said superposed strips and interposed layers along said straight edge being equal to a fraction of half a wave length of the shortest wave length of signal expected to be impressed on said strips, and means connecting the free ends of the arms of said strips in a series arrangement in which the strips and connecting means form a single loop coil of a plurality of turns in series with one another.

4. A device for generating in a loop of voltage proportional to the surface induction on a magnetic recording, which comprises a magnetic recording tape having an elongated face surface carrying on such face surface a signal magnetically recorded, a rigid plate of non-magnetic and electrically nonconducting material having a straight edge and a flat face contiguous with said edge, a plurality of U-shaped thin strips of electrically conducting non-magnetic material confined flat against said face in superposed, aligned relation with one another and with film-like layers of dielectric material disposed between and separating the superposed strips, and with the base portion of each strip disposed close to, and extending along, said straight edge of said plate, the total thickness of said superposed strips and interposed layers along said straight edge being equal to a fraction of half a wave length of the shortest wave length of signal impressed on said strips, and means connecting the free ends of the arms of said strips in a series arrangement in which the strips and connecting means form a single loop coil of a plurality of turns in series with one another, said plate with said loop coil thereon being disposed with said straight edge of the plate parallel to and contiguous with said elongated face of said tape face surface, whereby upon relative movement of said tape and said plate in a direction lengthwise along the said tape surface, a signal may be transferred from the recording on said tape to the coil on said plate, with maximum strength and clarity.

5. In a device for use in generating a voltage proportional to the surface induction on a magnetic recording to enable an absolute measurement of the signal strength on such recording, of the type having a magnetic recording tape having an elongated face surface capable of receiving and magnetically holding progressively thereon a signal that improvement which comprises the combination with said tape of a rigid plate of non-magnetic and non-conducting material having a straight edge and a flat face that is contiguous with said edge, a loop formed of a plurality of series-connected turns of a conductor of non-magnetic material confined flat against said plate face, with one side edge of the loop disposed closely along and contiguous with said straight edge, the portion of each of said turns that extends along said straight edge abutting flat against said plate face, but superposed on one another on said plate face in a direction away from that plate face, and thin films of dielectric material interposed between and separating and insulating from one another said superposed portions of said conductor that extend along said straight edge, the total thickness of said superposed portions of said conductor and the interposed films along said straight edge being a small fraction of half a wave length of the shortest wave length of a signal that is expected to be recorded on said face surface of said element, whereby when said plate with loop thereon is disposed with its said straight edge parallel to and contiguous and crosswise with said elongated face surface, upon relative movement of the tape and plate in the direction of elongation of said tape face, a signal corresponding to the recorded signal may be created in said loop with maximum strength and clarity.

UNITED STATES PATENTS

References Cited in the file of this patent

| | | |
|---|---|---|
| 1,837,678 | Ryder | Dec. 22, 1931 |
| 2,620,405 | Shickel | Dec. 2, 1952 |
| 2,654,142 | Horelick | Oct. 6, 1953 |
| 2,665,227 | Clough et al. | Jan. 5, 1954 |
| 2,703,854 | Eisler | Mar. 8, 1955 |

OTHER REFERENCES

"Printed Circuit Techniques," National Bureau of Standards Circular 468, November 18, 1947, pages 17, 18, 27, 29, 32, 33.